Figure 1:
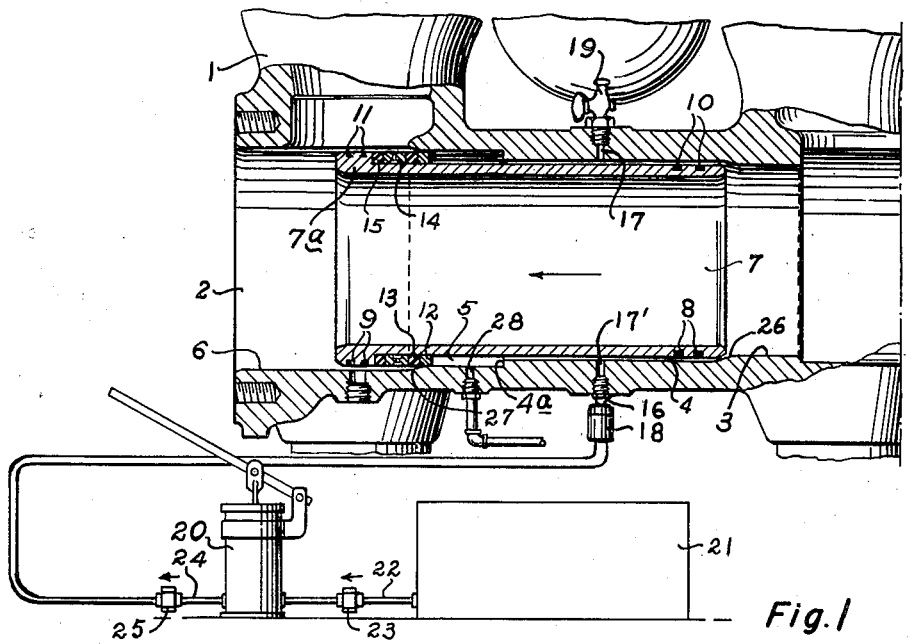

April 29, 1958  J. H. WILSON  2,832,653
CYLINDER ASSEMBLY
Filed Sept. 3, 1954

INVENTOR
John Hart Wilson

BY Watson, Cole, Grindle & Watson

ATTORNEYS

United States Patent Office 2,832,653
Patented Apr. 29, 1958

2,832,653

CYLINDER ASSEMBLY

John Hart Wilson, Wichita Falls, Tex.

Application September 3, 1954, Serial No. 454,082

5 Claims. (Cl. 309—3)

This invention relates to cylinder assemblies, and more particularly to the cylinders of reciprocating pumps, certain types of engines, and similar machinery wherein a liner is provided between the inner wall of the cylinder proper and the reciprocating member or piston.

It has been the practice for some years to employ, in cylinders of certain types of pumps, for example mud pumps used in well drilling operations, and in certain other types of machinery, replaceable liners within the wall of the cylinder proper, which replaceable liner provides the accurately finished bore within which the piston of the pump or engine reciprocates. In this way, all of the wear caused by operation of the machinery is taken by parts which can be replaced in a minimum of time and at a minimum of expense. It has been found, however, that removal of such cylinder liners is very difficult at times, due to a variety of factors. Such a liner must, of course, have a tight fit within the cylinder, in order to properly perform its function. Because of corrosion, introduction of foreign matter, principally sand, or to other causes, the liner may adhere so closely within the cylinder proper, after a period of use, that its removal becomes exceedingly difficult.

Accordingly, it is the general object of the present invention to provide a cylinder assembly comprising a cylinder proper and a liner therefor, in which the liner is fitted tightly within the cylinder bore at either end, an intermediate portion of the external wall of the liner being spaced from the adjacent wall of the cylinder bore to provide an annular space which may be kept full of lubricant, to prevent the entry of foreign matter, and also to prevent corrosion and consequent adherence of the liner to the cylinder bore.

A further object is the provision of a cylinder assembly of the character described, in which the cylinder bore and the liner are formed with complementary internal and external shoulders, respectively, the area of contact between such shoulders being in communication with the aforesaid annular space whereby, when it is desired to remove the liner, the latter may be "pumped" out by introducing a fluid under pressure into the said annular space and thence between the shoulders to force them apart and the liner out of the cylinder.

More specifically, it is an object of the invention to provide a cylinder having portions of four different internal diameters, the smallest being of such dimension as to receive, with a tight fit, the outer surface of a cylinder liner. This portion of the cylinder bore is connected, by a gently tapered portion, with a portion of slightly larger diameter, which is spaced from the external wall of the liner, this portion of the cylinder bore terminating in an abrupt shoulder, marking the beginning of a portion of still larger diameter which is adapted to receive, with a tight fit, an external collar formed on the liner, together with packing rings seated externally of the liner between the said collar and the said shoulder. Lastly, there is a further bore portion of slightly larger diameter, connected with the previously described bore portion by means of a gentle taper, the bore portion of largest diameter being adapted to receive, in a relatively loose manner, the aforesaid collar and packing rings after they have been ejected from the bore portion previously described, after which the liner may be manually removed from the cylinder bore without difficulty. It is necessary, of course, that provision be made for introducing a fluid under pressure into the space between the liner and the said second bore portion.

Figure 2:
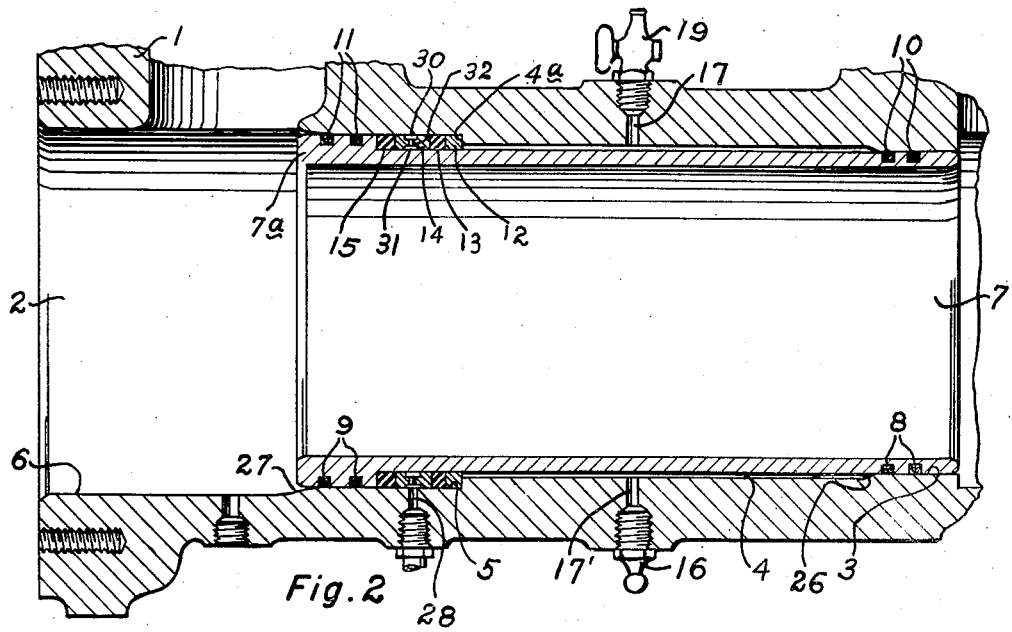

Other and further objects, features and advantages will be apparent from the description which follows, read in connection with the accompanying drawings in which:

Figure 1 is a partial axial section of a mud pump cylinder having a liner constructed in accordance with the present invention, the liner being shown in full lines, in a partially removed position, the completely installed position being indicated by dotted lines; and Figure 2 is an enlarged fragmentary view corresponding to a portion of Figure 1.

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

The invention is presently described in connection with a mud pump used, for example, in well drilling operations. Such mud pumps are well known, and the mode of operation and constructional details form no part of the present invention and will not be described. For present purposes it is sufficient to point out that a portion 1 of the mud pump body is provided with a cylindrical bore 2 which has portions of several, and preferably four, different diameters. The innermost bore portion 3 is of a diameter adapted to receive, with a close fit, the outer cylindrical surface of the sleeve or liner 7. Bore portion 3 is connected by tapered portion 26 with a bore portion 4 of a substantially larger diameter, for example 1/8 inch larger, which provides, with the outer wall of the liner 7, an annular chamber of corresponding radial depth. The bore portion 4 terminates in an abrupt radial shoulder 4a leading into a bore portion 5 of still greater diameter. The bore portion 5 is connected, by a tapered portion 27, with the bore portion 6 of largest diameter.

The sleeve or liner 7 is formed with an annular collar 7a of a diameter to fit closely the bore portion 5. The collar 7a is provided with several external annular grooves 9 to receive O-rings 11, while the opposite end of the sleeve is provided with several external annular rings 8 to receive similar O-rings 10.

Packing means are provided about the liner 7 between the collar 7a and the shoulder 4a of the pump cylinder bore. A suitable assembly may comprise a ring 12 of hard brass or bronze, a ring 13 of rubber or the like, a "lantern" ring 14, having inner and outer annular grooves 31 and 30 connected by spaced radial apertures 32, and a ring 15 of rubber or other material, similar to ring 13. When the cylinder liner is fully in place, the rings 12–15 are tightly compressed between collar 7a and shoulder 4a.

The walls of the cylinder bore portion 4 are pierced by two passages 17 and 17'. The passage 17 is fitted with a stop cock 19, while the passage 17' is fitted with a conventional grease fitting or any suitable check valve 16 adapted to mate with the coupling member 18 of a lubricant pump 20 or other suitable source of fluid under pressure. The pump 20 may, for example, draw lubricant or other fluid from a reservoir 21 through conduit 22 and check valve 23, and may supply such lubricant or other fluid to the coupling 18 through conduit 24 and check valve 25.

The wall of the cylinder bore portion 5 is provided with a passage 28 which is normally in communication with the outer annular groove 31 of the lantern ring 14. The passage 28 may remain open, or it may be connected with any suitable tell-tale device, capable of giving an indication whenever any substantial quantity of lubricant or other pressure fluid exits through the passage 28.

The manner of use of the above-described assembly is as follows. With the O-rings 10 and 11 in position within their respective grooves 8 and 9 and the packing assembly 12–15 in place as illustrated, the liner 7 is inserted within the cylinder bore 2 and is pressed home to the dotted line position of Figure 1. The tapers 26 and 27 connecting the bore portions 3, 4 and 5, 6 assure avoidance of damage to the O-rings 10 and 11 during insertion of the liner. As mentioned above, the packing assembly 12–15 is compressed between the collar 7a of the liner and the shoulder 4a of the cylinder, making a tight seal between the cylinder wall and liner and, together with the O-rings 10, effectively sealing the ends of the annular chamber between the bore portion 4 and the liner 7. Longitudinal pressure may be maintained against the liner 7, to insure proper longitudinal compression and radial expansion of the rings 13 and 15, by any suitable mechanical means (not shown). The metal ring 12 fits the liner 7 with sufficient tightness so that the rubber ring 13 cannot expand between ring 12 and liner 7, and enter the aforesaid annular chamber.

When the liner is in the dotted line position of Figure 1, the pump 20 is operated to fill the annular chamber between the liner and bore portion 4 with lubricant or other pressure fluid. During this operation, the stop cock 19 remains open to permit egress of air from the said annular space. When the lubricant or other pressure fluid begins to pass out through the stop cock 19, the latter is closed. By virtue of the stop cock 19 and check valve 16 (or check valve 25 if no check valve is used at 16), the said annular chamber, filled with pressure fluid, is thus closed and the fluid may be placed under any desired pressure after the stop cock 19 is closed. Entrance of foreign matter, for example mud, into the aforesaid annular chamber is thereby effectively prevented.

If, in the course of time, the fluid within the annular chamber begins to leak past the rings 12 and 13, it will pass through the lantern ring 14 and exit from the passage 28, thereby being visible to the operator or, if a tell-tale device is connected to the passage 28, operating such device. The liner may then be removed and the packing replaced. In order to remove the liner it is only necessary to apply sufficient pressure, within the annular space between the liner and the bore portion 4 of the pump 20, to force the liner outwardly to the position illustrated in solid lines in Figure 1. At this point the O-rings 10 have left the bore portion 3 and the rubber ring 13 has left the bore portion 5. The liner can then be manually removed from the cylinder without difficulty.

Having thus described the invention, what is claimed as new and desired to be secured by Letters Patent is:

1. A cylinder assembly for a reciprocating fluid pump comprising, in combination, a cylinder body having a stepped cylindrical bore, said bore including a first portion of minimum diameter, a second portion of larger diameter, and a third portion of still larger diameter, said first and second portions being joined by a tapered portion and said second and third portions being joined by an annular shoulder, a cylindrical sleeve within said bore, one end of said sleeve closely slidably fitting said first bore portion, said sleeve having an outwardly projecting annular collar adjacent its other end and closely slidably fitting said third bore portion, and means for introducing fluid under pressure into the annular space between said sleeve and said second bore portion so that said cylindrical sleeve may be removed longitudinally from said cylindrical bore by fluid pressure introduced into said annular space.

2. The combination according to claim 1, including annular packing means surrounding said sleeve adjacent said collar and forming an annular sliding seal between said sleeve and the wall of said third bore portion.

3. A cylinder assembly for reciprocating mud pumps, comprising a cylindrical body having a stepped cylindrical bore, said bore including a first portion of minimum diameter, a second portion of larger diameter, a third portion of still larger diameter, and a fourth portion of greatest diameter, said first and second portions being joined by a transition taper, said second and third portions being joined by an annular shoulder, and said third and fourth bores being joined by a transition taper, which transition tapers slope in the same direction, a cylindrical sleeve within said bore, one end of which sleeve is shouldered for a portion of its length and is adapted to be fitted within said third cylindrical portion of said bore, said sleeve having annular grooves formed therein near each end thereof, which annular grooves are spaced apart longitudinally so that the inner-most groove near each end of said cylinder is spaced longitudinally of said sleeve substantially the same distance as the beginning of each of said transition tapers between said first and said second bores and between said third and said fourth bores of said cylinder, O-ring sealing elements fitted within the respective grooves for sealing relation with said first and third portions of said bore, packing elements within said enlarged annular bore formed between said sleeve and said third portion of the bore and forming an annular piston element, said cylindrical body having an opening formed therethrough and in communication with said second bore, and means of introducing a fluid under pressure into said second bore so said fluid will react on said packing elements to move said cylindrical sleeve longitudinally of said cylindrical bore.

4. The combination of claim 1, said stepped bore including a fourth bore portion of larger diameter than said third bore portion and joined thereto by a tapering portion, which transition taper portions slope in the same direction, said cylindrical sleeve having a group of longitudinally spaced annular grooves near each end thereof, which groups are longitudinally spaced apart a distance equal to the distance between said tapered portions of said bore, and sealing elements fitted within said annular grooves in tight sealing relation with said bore.

5. A method of removing a pump cylinder liner from a pump cylinder, which cylinder and liner are formed to provide therebetween an annular chamber closed at one end by an inwardly projecting annular portion of the cylinder and at the other end by an outwardly projecting annular shoulder carried by the liner, comprising the step of introducing fluid under pressure into said annular chamber to bring about longitudinal displacement of said liner relative to said cylinder.

References Cited in the file of this patent

UNITED STATES PATENTS

| | | |
|---|---|---|
| 961,375 | Seabrook | June 14, 1910 |
| 1,843,463 | Tawresey | Feb. 2, 1932 |
| 2,081,431 | Hamer | May 25, 1937 |
| 2,163,885 | MacClatchie et al. | June 27, 1939 |
| 2,223,223 | Muller | Nov. 26, 1940 |
| 2,348,293 | Hamer | May 9, 1944 |
| 2,530,246 | Kirkpatrick et al. | Nov. 14, 1950 |
| 2,584,518 | Walton | Feb. 5, 1952 |
| 2,640,434 | Leman | June 2, 1953 |
| 2,650,868 | Waldron | Sept. 1, 1953 |
| 2,678,247 | Geyer | May 11, 1954 |
| 2,720,691 | Kuniholm | Oct. 18, 1955 |